United States Patent [19]

Fabel

[11] Patent Number: 4,461,661

[45] Date of Patent: Jul. 24, 1984

[54] NON-TENTING BUSINESS FORM ASSEMBLIES AND METHOD AND APPARATUS FOR MAKING THE SAME

[76] Inventor: Warren M. Fabel, 7 Peters La., Pound Ridge, N.Y. 10756

[21] Appl. No.: 332,197

[22] Filed: Dec. 18, 1981

Related U.S. Application Data

[60] Division of Ser. No. 132,515, Mar. 21, 1980, abandoned, which is a continuation-in-part of Ser. No. 19,150, Mar. 9, 1979, abandoned.

[51] Int. Cl.³ ........................ B32B 31/10; B32B 31/18; B65D 27/10

[52] U.S. Cl. ........................................ 156/70; 156/108; 156/252; 156/272.4; 156/275.3; 156/291; 156/308.4; 229/69; 229/73

[58] Field of Search .............. 156/70, 108, 252, 272.4, 156/275.1, 275.3, 308.4, 291; 229/69, 71, 73

[56] References Cited

U.S. PATENT DOCUMENTS

| | | | |
|---|---|---|---|
| 1,141,172 | 6/1915 | Clark | 229/71 |
| 3,350,988 | 11/1967 | Schultz | 156/252 |
| 3,528,867 | 9/1970 | Leatherman et al. | 156/272.4 |
| 3,620,875 | 11/1971 | Guglielmo, Sr. et al. | 156/272.4 |
| 3,682,740 | 8/1972 | Newton | 156/291 |
| 3,709,775 | 1/1973 | James | 156/272.4 |
| 3,837,565 | 9/1974 | Johnsen | 229/73 |
| 4,012,268 | 3/1977 | Johnsen | 156/291 |
| 4,050,582 | 9/1977 | Kalve | 229/69 |
| 4,172,605 | 10/1979 | Welsch et al. | 229/69 |
| 4,190,162 | 2/1980 | Buescher | 229/73 |
| 4,252,585 | 2/1981 | Raabe et al. | 156/272.4 |

*Primary Examiner*—Michael G. Wityshyn
*Attorney, Agent, or Firm*—Lilling & Greenspan

[57] ABSTRACT

A business form assembly, and the method of forming the same, is described. The business form assembly includes superimposed front and back sheets with at least one of the sheets being provided on the surface thereof facing the other of the sheets with a dormant adhesive in the nature of a thermoplastic material which is rendered activatable by electromagnetic radiation. Sealing lines are formed between the sheets where the dormant adhesive is activated, the resulting sealing lines together defining a receiving compartment suitable for accepting a document for mailing or an object for storage. The sealing lines have generally negligible thicknesses and uniform widths along their lengths. Also described is the apparatus for making the business form assemblies. The mailing assemblies are suitable for manufacture either individually or as part of a continuous series or web of business form assemblies which can be processed through data processing or imprinting equipment prior to separation from each other.

17 Claims, 29 Drawing Figures

NON-TENTING BUSINESS FORM ASSEMBLIES AND METHOD AND APPARATUS FOR MAKING THE SAME

CROSS-REFERENCE TO RELATED APPLICATION

This is a division of application Ser. No. 132,515, filed Mar. 21, 1980 which is a continuation-in-part of application Ser. No. 19,150, filed Mar. 9, 1979, now abandoned.

BACKGROUND OF THE INVENTION

Numerous envelopes and insert materials for such envelopes have been created to accommodate a growing demand for expeditious mailings. Such mailings, normally used in conjunction with computer-generated imprinting equipment, have been used with increased frequency for billing, statements and notices and other like applications. Most of the known business form structures have been produced as continuous webs of detachable envelopes each of which is a self-contained assembly suitable for processing and mail handling. Normally, however, the series connected envelopes are not separated from each other until they have been fully processed to facilitate handling thereof, particularly through high speed printers and other printing or typing apparatus.

One of the problems in the manufacture of continuous envelopes with inserts is the problem of maintaining the insert material in a desired position. This is important because while the envelopes are processed, they normally go through high speed impact printers which address the envelopes and type other pertinent information on the single or multiple page inserts. In order to image the information in the appropriate spaces, the positions of the inserts must be predictable and, accordingly, are normally attached to the outer envelope to prevent relative movements therebetween. This, however, may frustrate simple removal of the insert from the envelope.

Previous products all utilize cold or water soluble glue to fasten the front and back sheets of the outer envelope and, in some instances, to glue the insert to the front and back sheets. The glue does not dry thoroughly for hours after the assembly has been folded into a flat pack suitable for computer printer feeding. The continuous web is folded at succeeding points where adjacent envelopes are detachably connected to each other. Folding before the glue has dried produces a condition known as "tenting" where the various plies of the assembly shift relative to each other to facilitate folding and take a set. When the glue dries after the assembly is folded into a flat pack, any attempts to unfold the web along the fold lines leaves residual protuberances running across the width of the web at each fold line. This "tenting" problem is not acceptable for proper feeding into a computer printer since it frequently causes the printer to jam up, this resulting in down time and increased mailing costs. All previous products exhibit this condition in various degrees, the problem becoming more aggravated the more plies that are joined to each other and, therefore, the more glue that is used. Many forms of tenting are so severe at the manufacturing stage that the product is never shipped to the consumer. Other flat packs that are shipped do not feed at all or feed so poorly that printers cannot be allowed to run unattended. In addition to the added expense in requiring supervision of the computer printers, all the forms that are damaged during jam-ups must, of course, be replaced and this still further increases the costs.

Known sealed envelope assemblies and the methods of making the same have also been wasteful in terms of the inefficiency of conversion of paper stock to completed mailing assemblies. Firstly, because cold glue is basically uncontrollable as to the width of the glue line produced, heavily applied glue has a tendency to bleed to a wider width when compressed between plies. Previous manufactures of pre-stuffed envelopes, therefore, allow for wide tolerances in gluing, this requiring larger envelopes in relation to the insert sizes to assure that there is no adhesion of the insert to the outer envelope. However, this adds to the waste factor and it is estimated that the total waste at the manufacturing level may be as high as 35–40 percent, a situation that can no longer be tolerated in this current day of shortages and dwindling supplies of natural resources.

Pre-inserted mailers normally require a large volume to be cost efficient. The large volume users rarely keep "hard copy" records of transactions printed on the mailers since the information is normally available in computer storage. When the envelopes are run through a high-speed impact printer, the printing head strikes the front of the envelope at different surface areas thereof to image information on selected portions of the insert sheets or plies by use of selectively coated carbon or other image transfer means between the sheets. However, since all the information with the exception of the mailing address that is recorded on the insert need not be reproduced on the face of the envelope, a "record copy" is normally placed on top of the envelope, the "record copy" usually having a carbon patch only behind the location where the name and address of the addressee is printed so that the balance of the information is not imaged on the top surface of the envelope. Since, as noted above, the record copy is usually discarded, this creates additional waste and requires an additional time-consuming operation on a business forms decollator for its removal.

In addition to being inefficient, the prior art procedures for the manufacture of two-way mailers require the use of a great number of sheets or plies in the formation of the mailer, including the cover sheet, the outgoing envelope, the return envelope and the back sheet of the outgoing envelope. Upon receipt, the recipient destroys the outgoing envelope, removes the document and uses the return envelope for inserting all or a portion of the document for return to the sender with, usually, a remittance. The discarding of the outer envelope by the recipient, together with the above-noted discarding of the cover sheet, therefore, represents a fifty percent waste of materials.

U.S. Pat. No. 3,350,988, for a method of making continuous form envelopes, teaches the use of thermo-sensitive plastic as the outside plies or sheets. Plastic or polyethylene, however, has a great tendency to stretch and would do so when driven through a computer printer tractor feed rendering it impossible to feed. This patent also suggests the inclusion of an insert after the envelope is formed but does not disclose how this is done. Insertion of an insert after sealing through a narrow slot could be slow if not impossible.

In U.S. Pat. No. 3,477,194, which discloses a heat sealed thermoplastic package, an infra-red heat source is used to seal the packages. The heat is not applied selectively and is only concentrated in desired sealing regions by the use of a darker border printed on the package which is more receptive to the infrared radiation. Using the method of this patent to produce forms would heat all parts of the form to a temperature which would burst an encapsulated carbonless transfer medium and, therefore, ruin the form. If carbon paper were used, the carbon would melt and run or bleed and cause the pages or sheets to stick. Likewise, the method of sealing disclosed in this patent could not be used in conjunction with my invention for single and multi-ply non-impact printing disclosed in my U.S. patent application Ser. No. 19,150, which uses coatings which change color when heated to a threshhold temperature. Furthermore, the heating method of this patent is comparatively slow and would not be capable of keeping up with current collating equipment which normally produces forms at approximately 200 to 750 forms per minute.

An article for postal use, allowing for a reply, is disclosed in U.S. Pat. No. 3,899,127. The two-way mailer of the patent utilizes a transparent face on the envelope, the removal of the insert exposes a secondary address and the original indicia becomes the return address. Such an arrangement would not meet current U.S. Postal Regulations that require a standard position (upper left) for the return address.

Some typical prior art constructions will now be described. In U.S. Pat. No. 3,104,799, for an envelope assembly, the insert has an extension in the nature of a detachable strip which is sealed to the marginal or detachable strip of the envelope and simultaneously removed when the combined strip is detached. However, because the insert strip has to be glued to the envelope strips, this increases the thickness of the glued region, requires additional glue and all this promotes the above-described tenting.

A sealed envelope assembly with interior mailing material is described in U.S. Pat. No. 3,339,827, where an attempt has been made to decrease the thickness of the glued marginal area. The successive inserts are originally attached to a continuous common marginal strip which is aligned or superimposed with the detachable strips of the envelope. However, prior to gluing the marginal strips of the envelope, the front and back strips of the envelope are turned upwardly and backwardly to expose the marginal material of the insert and the same is trimmed after which the detachable strips of the envelope are glued together. This renders the insert relatively free within the envelope compartment and, in order to avoid excessive shifting, the patentee proposes to use frangible connecting means or fugitive glue. However, when fugitive glue is applied between the top sheet of the insert and the front sheet of the envelope, it tends to stick to the facing surfaces and remove printing and carbon transferred data, thereby decreasing the quality and appearance of the mailed materials.

In U.S. Pat. No. 3,608,816, for a sealed envelope with removable insert, the insert extends beyond the tear strip on one side of the envelope and fugitive adhesive is applied so that pulling on the insert releases it. While the patentee states that this simplifies removal of the insert, it does not overcome the more important problems discussed above.

As suggested above, excessive shifting of an insert inside an envelope may create a problem since the insert may not be properly aligned for imaging information in the proper spaces provided therefor. While it is not normally essential that the insert be absolutely fixed in place, movement should be minimal. An attempt to mobilize an insert within the compartment of a sealed envelope is disclosed in U.S. Pat. No. 3,777,971. To achieve this, the back sheet of the envelope is provided with embossments which abut against the preipheral edges of the insert and thereby immobilize the insert. To the extent that the insert does not extend into the region of the glue lines and is not glued to the front and back sheets of the envelope, the thickness of the marginal edges of the web are decreased and less glue is used, and the tenting problem is somewhat alleviated. However, tenting is not totally eliminated. Also, since the embossments are merely in the nature of crimps in the back sheet of the envelope. These do not provide positive means for positioning the insert.

Another attempt to alleviate the problem of tenting is described in U.S. Pat. No. 3,941,308 for a continuous mailing envelope assembly with inserts and method therefor. As with the previous described patents, to the extent that the insert is not glued to the envelope in the region of the lateral tear strip, and the thickness and the amount of glue used in the region is reduced, tenting may be alleviated to a certain extent. However, tenting will still exist since the disclosed assembly still uses cold, water-soluble glue which does not dry until after the series of envelopes are folded upon each other, thereby permitting relative slippage between the glued layers prior to glue hardening. The mailer envelope disclosed in the patent under discussion has the additional disadvantage in that it teaches the use of glue lines along the transverse perforation or separation lines between adjacent envelopes. Application of adhesive in this manner would result in the glue bleeding through the perforations thereby attaching adjacent envelopes to each other and rendering the entire stack of envelope useless.

Another problem which has existed in the direct mail advertising business is in the use of direct mail letters with reply cards. These letters typically include a patch in the back of the letter sealed along only three sides to form a compartment which is open at the fourth side. A reply postcard or envelope is normally enclosed inside the compartment with the address of the recipient being visible through a die cut opening in the face of the letter. At present, the patch on the back of the letter is glued by means of a cold, water-soluble glue to the back of the letter to form the card or inset receiving compartment. However, after the compartments were formed, another, usually manual, step was required to insert the card, envelope or the like into the compartment.

SUMMARY OF THE INVENTION

Accordingly, it is an object of the present invention to provide an individual and continuous series of business form assemblies which do not possess the above-described disadvantages inherent in prior art assemblies.

It is another object of the present invention to provide business form assemblies which are simple in construction and economical to manufacture.

It is still another object of the present invention to provide a continuous series of business form assemblies which does not exhibit tenting.

It is yet another object of the present invention to provide business form assemblies which can be conveniently opened by the recipient.

It is a further object of the present invention to provide business form assemblies which avoid excessive shifting of the insert during computer printing operations.

It is still a further object of the present invention to provide business form assemblies which do not use cold or water-soluble glues to join the front and back plies of the assemblies.

It is yet a further object of the present invention to provide business form assemblies which can be manufactured to closer tolerances and therefore results in less paper waste.

It is an additional object of the present invention to provide a two-way mailer which uses the same envelope for outgoing as well as for return mail thereby effecting substantial savings in materials and costs.

It is still an additional object of the present invention to provide a two-way mailer, the envelope of which is reinforced and/or waterproofed to provide the mailer with sufficient strength to be processed twice through postal service equipment.

It is yet an additional object of the present invention to provide a business form assembly which includes a transparent pocket for storing and viewing the contents thereof.

It is another object of the present invention to provide a business form mailer which is provided with a transparent material in conjunction with a die cut window provided therein to prevent jamming in automated postal sorting equipment.

It is still another object of the present invention to provide business form assemblies which require a reduced number of plies necessary for a two-way mailer and thereby improve the quality of the image formed by a high speed impact printer.

It is yet another object of the present invention to provide pre-inserted mailers which require a lesser number of plies used in conjunction with the mailers, including elimination of the top cover sheet and/or secondary envelopes, thereby conserving natural resources.

It is a further object of the present invention to simplify job set-up on collators and presses and thereby reduce the costs of manufacture, and, therefore, decrease the operation costs and the ultimate costs to the consumer.

It is still a further object of the present invention to provide a continuous series of business form assemblies which can be fed through high-speed printers without jamming the same and, therefore, which does not require the printing equipment to be continuously attended.

It is yet a further object of the present invention to provide a continuous series of business form assemblies which does not always require a hard copy top or cover sheet during computer printing operations.

It is an additional object of the present invention to provide a method of forming a continuous series of business form assemblies conveniently and efficiently, and with great flexibility with respect to the sizes of the assemblies as well as of the insert receiving compartments.

It is still an additional object of the present invention to provide an apparatus for manufacturing business form assemblies in accordance with the present invention.

In order to achieve the above objects, as well as others which will become apparent from the description that follows, a business form assembly in accordance with the present invention comprises superimposed front and back sheets. At least one of said sheets is provided on the surface thereof facing the other of said sheets with a heat activatable dormant adhesive and an electro-magnetic reactant which generates heat when exposed to a form of electro-magnetic radiation. Sealing lines are provided between said sheets and formed where said dormant adhesive is activated when selectively exposed to suitable electro-magnetic radiation, said sealing lines together defining a receiving compartment. Said sealing lines have generally negligible thicknesses and uniform widths along their lengths.

In accordance with one embodiment of the invention, the business form assembly further comprises an insert having dimensions generally smaller than sheets and positioned in relation to said sheets prior to adhesive activation to be disposed within said compartment when said sheets are joined.

Said dormant adhesive may be in the nature of a coating on one of said sheets, or may be a sheet of thermoplastic material which either forms one of said sheets or is interposed between said front and back sheets prior to activation or an applied mixture of the said dormant adhesive in a powdered or granulated form and the electro-magnetic reactant in a printable vehicle such as clear printing ink.

In accordance with another feature of the present invention, positioning means are provided for positioning said insert within an area defined by the sealing lines.

According to a presently preferred embodiment, said dormant adhesive is activatable by heating and is activated by selective application of electro-magnetic waves to produce local heating to form receiving compartments having desired configurations.

According to another feature of the invention, said front sheet is provided with a die cut window for exposing a portion of said insert therethrough, the exposed portions of said insert being provided with a self-imaging means for displaying information through said window when processed through an impact printer with ribbon removed. This allowed direct imprinting of the mailing assembly without utilizing a top or cover sheet interposed between the mailing assemblies and the printing head.

A continuous series of business form assemblies comprises superimposed continuous upper and lower webs. A series of longitudinally spaced generally transverse perforations or lines of weakening are provided within said upper and lower webs to define a plurality of successive sets of superimposed front and back sheets which, together with the inserts, define a series of business form assemblies in the nature of pre-inserted mailers.

The method of the invention comprises the steps of superimposing front and back sheets, with at least one of said sheets being provided on the surface thereof facing the other of said sheets with a dormant adhesive which is activated by the selective application of electro-magnetic radiation and an electro-magnetic reactant. The dormant adhesive is selectively activated to form sealing lines having negligible thicknesses and uniform widths along their lengths between said sheets, said sealing lines together defining a receiving compartment.

The present invention also contemplates apparatus for producing business form assemblies of the type generally suggested above.

BRIEF DESCRIPTION OF THE DRAWINGS

Further advantages of the invention will become apparent from a reading of the following specification describing illustrative embodiments of the invention. This specification is to be taken with the accompanying drawings in which:

FIG. 19 illustrates a flat pack of assemblies of letters with pre-inserted reply cards or envelopes made in accordance with the present invention and adapted to be processed through a matrix type computer printer or the like.

DESCRIPTION OF THE PREFERRED EMBODIMENTS

Figure 1:
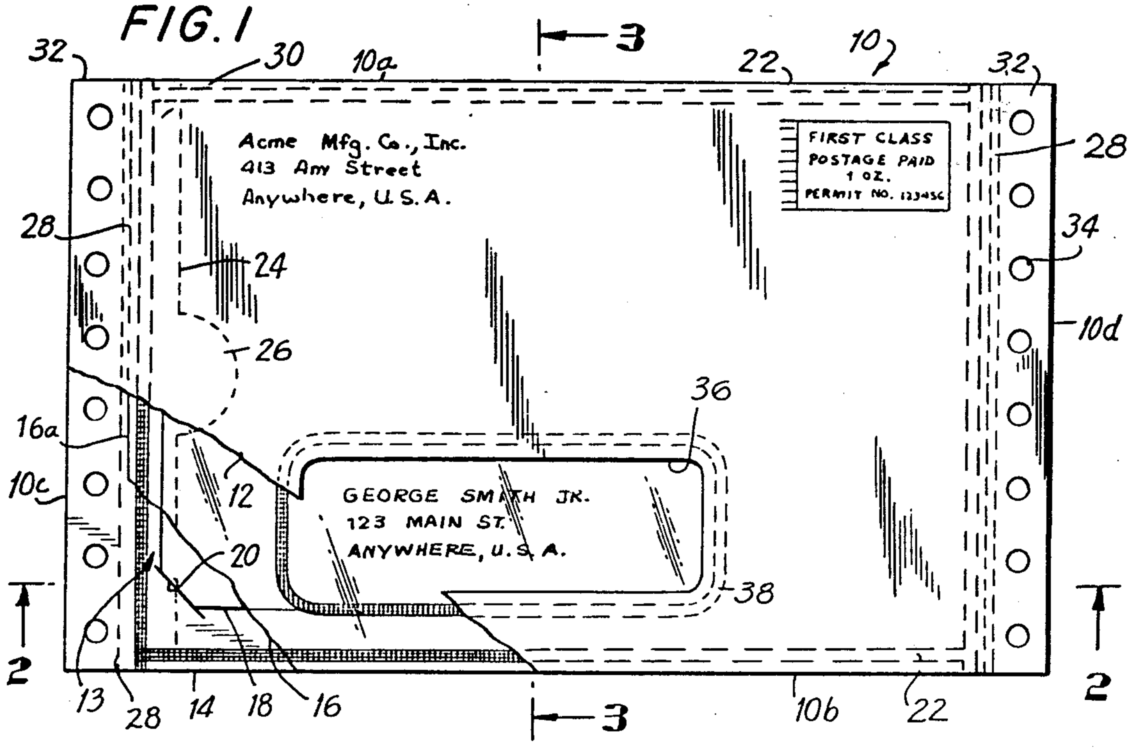
FIG. 1 is a front elevational view, partly broken away, of a business form assembly in the nature of a pre-inserted mailer with a closed window in accordance with the present invention.
Figure 2:
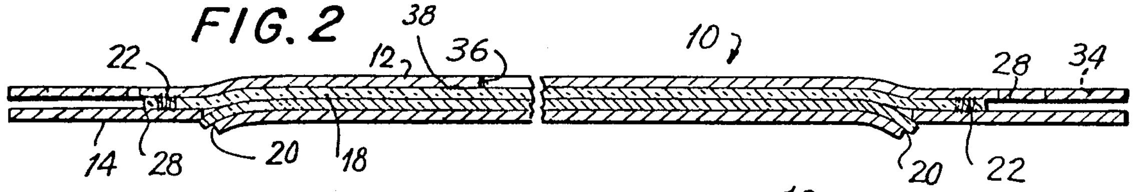
FIG. 2 is an enlarged cross-sectional detail of the pre-inserted mailer shown in FIG. 1, taken along line 2—2, the positioning means for holding the insert in place being exaggerated to show the details thereof.
Figure 3:
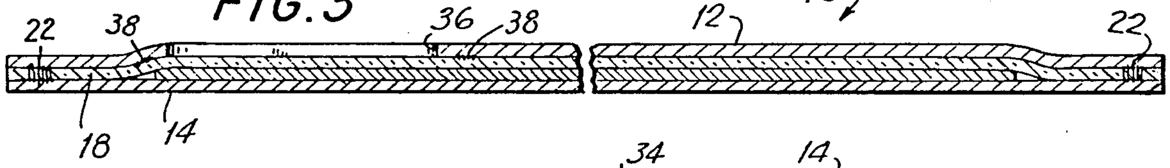
FIG. 3 is similar to FIG. 2, but taken along line 3—3 in FIG. 1.
Figure 10:
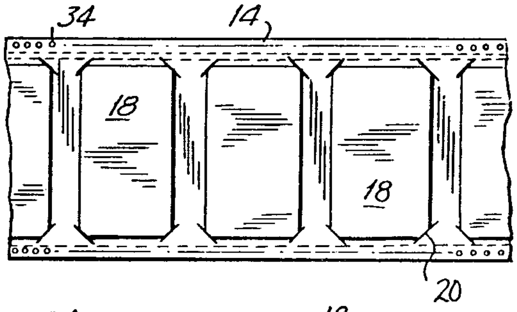
FIG. 10 is a top plan view of the back or bottom sheet of the pre-inserted mailer prior to assembly on the rotary collator shown in FIG. 9, shown exaggerated for clarity.
Figure 11:
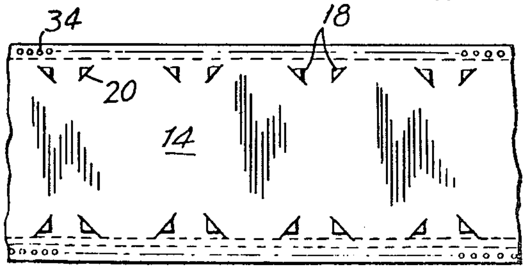
FIG. 11 is a bottom plan view of the back or bottom sheet shown in FIG. 10, also illustrating one positioning means for detachably securing inserts, shown exaggerated for clarity.

Referring now to the drawings, wherein the identical or similar parts are designated by the same reference numerals throughout, and first referring to FIGS. 1-3, the reference numeral 10 identifies a business form assembly in the nature of a pre-inserted mailer in accordance with the present invention.

The business form assembly 10 includes a front or top sheet 12 and a bottom or back sheet 14 which are generally equal in size and superimposed against each other as shown.

At least one of the sheets 12, 14 is provided on the inside surface thereof which faces the other of the sheets with a dormant adhesive 16. The dormant adhesive may either be in the nature of a coating of heat sensitive adhesive, applied to one of the sheets of the assembly 10 or may be in the nature of a separate sheet of thermoplastic material, as will be more fully described hereafter.

In accordance with the broader aspects of the present invention, a dormant adhesive is used to join two plies or sheets together to form a receiving compartment 13 or the dormant adhesive itself acts as a wall of such receiving compartment. An important feature of the invention is that the dormant adhesive is activated during the collating of the various plies of the business form, and sealing lines are formed which have generally negligible thicknesses and uniform widths along their lengths. As will become more evident from the description that follows, the use of a dormant adhesive makes it possible to efficiently and economically produce business forms of various types which do not exhibit the disadvantages, for example, of tenting in prior art pre-inserted mailers.

As noted above, the dormant adhesive 16 may be a coating applied to one of the plies of the mailer or may be a separate sheet or membrane of a thermoplastic material. It is contemplated that any dormant adhesive which will achieve the objects of the present invention can be used, and the specific type of dormant adhesive is not critical for purposes of the present invention. By way of example, only, paper which has been precoated with a thermoplastic material, known as heat seal paper, may be used. Such paper is manufactured by, for example, Brown Bridge Mills of Troy, Ohio, and Nashua Corp. of Nashua, N.H. When using a separate sheet or membrane of thermoplastic material, any material that will repeatedly soften when heated and harden when cooled can be used. For example, thermoplastic materials such as polyvinyl chloride (PVC); polyamides such as nylon; polyethylene; fluoronated polymers such as polyvinyl fluoride; ethylene copolymers; polypropylene; polystyrene; cellulose polymers such as cellulose acetate; or polyurethane. These enumerated materials can, of course, be provided either as a separate sheet of material or can be preapplied to one of the plies or sheets of the business form assembly.

An important feature of the present invention is that activation of the thermoplastic adhesive is by use of an electromagnetic radiation (EMR) reactant such as an EMR lossy or absorbent material or a Ferrite 22' or a substance or composition which includes and has the EMR properties of ferrites which is selectively printed on or applied to one of the facing sheets in the business form assembly 10 in heat transfer relationship with the dormant adhesive 16 so that when acted upon by, for example, microwave radiation, local heating is produced melting the adhesive and therefore joining the two sheets when the heat released by the ferrite 22' is transferred to the adhesive 16.

In the pre-inserted mailer shown in FIG. 1, an insert 18 is enclosed within a compartment formed by the front and back sheets 12, 14. Advantageously, positioning means are provided for at least loosely and detachably securing the insert 18 between the front and back sheets 12, 14 to prevent excessive displacement with respect thereto. The positioning means, as will become more evident hereafter, is important to maintain the insert in a predetermined position during computer printer processing in order to ensure proper registry of date in the desired fields.

To be in heat transfer relationship, the adhesive 16 and reactant 22' may be on separate sheets which are in abutment or may be incorporated in a single coating, such as where the reactant is suspended in the adhesive coating.

Referring to FIGS. 1-3, the positioning means shown includes the use of slits 20 which are provided in the back sheet 14 and which are spaced from each other along a path generally corresponding to the peripheral outline of the insert 18. In the business form assembly shown in FIG. 1, the slits 20 are provided at the respective corners of the insert and are arranged for receiving the insert corners. The positioning means or slits 20, in addition to maintaining the insert 18 centrally of the back or bottom sheet 14 for purposes of proper printing registry, also prevents interference by the insert during joinder of the front and back sheets 12, 14, as will now be described.

The dormant adhesive, whether in the nature of a coating or a separate film or membrane, when activated, produces sealing lines 22 which, in the assembly 10 shown in FIG. 1, extends about the periphery of the front and back seets 12, 14. As will be more fully described, the sealing lines 22 are formed by activation of the thermoplastic or other activatable material 16 during the assembly operation of the business form assembly 10. In the instance of a thermoplastic material, for example, activation of the layer of dormant adhesives involves selective application of heat under pressure so as to momentarily soften the dormant adhesive. Once heat is removed, the thermoplastic material again hardens and simultaneously forms a seal between the layers or plies of the business form assembly and itself.

An advantage of this approach is that the sealing lines 22 have generally negligible thicknesses and have uniform widths along their lengths. This allows for manufacture of the business form assemblies to closer tolerances between the sealing lines 22 and the insert 18. This, further, allows a savings in materials. Typically, the width of the sealing lines 22 in accordance with the present invention need be no greater than 1/32 inch as compared to the up to ⅜ inch thicknesses for sealing lines utilizing cold, water-soluble glues. Additionally, and of primary importance, the substantially instantaneous re-hardening of the dormant adhesive while the sheets 12 and 14 are held in alignment assures that these remain aligned and does not allow relative shifting during and after folding. This, therefore, prevents the above-mentioned problem of tenting.

It should be evident that while the insert 20 is illustrated as comprising of only one sheet or ply, the insert 20 can have two or more plies and may additionally include a return envelope. Only a single ply has been shown to facilitate illustration.

Still referring to FIG. 1, both front and back sheets 12, 14 are provided with a tear strip perforation 24 which is generally in the form of a straight line with an optional thumb notch perforation 26. While the tear strip perforations 24 are generally aligned in FIG. 1, this is not critical and the tear strip perforations for the top and back sheets of the assembly 10 can be displaced or offset from each other.

The business form assembly 10 is further provided with tear strip perforations 24 spaced from the marginal perforations 28 on one side of the business form assembly 10 to form a tear strip portion 30. The tear strip portion 30 can be provided on either side of the business form assembly 10. In the embodiment being described, the tear strip perforations 24 are arranged with respect to the slits 20 to release the insert 18 from the effect of the positioning means when the tear strip portion 30 is detached from the business form assembly 10. This is accomplished by destroying the slits through which the tear strip perforations 24 pass, this facilitating and enabling removal of the insert 18 from the compartment which contains the same. The business form assembly 10 is additionally provided with standard control punched margins 32 provided with standard control punching 34 for feeding a continuous series of such assemblies through computer printing equipment.

The thermoplastic sheet of dormant material 16 extends between the top and bottom edges 10*a*, 10*b* of the business form assembly 10. However, its width is selected to position its lateral edges 16*a* between the lateral sealing lines 22 and the marginal perforations 28. While the thermoplastic material can extend beyond the marginal perforations 28, this is not required to practice the invention and not desirable. If the thermoplastic sheet material does extend beyond the marginal perforations 28, it should be provided with perforations which are aligned with the marginal perforations 28 so as to allow easy removal of the marginal control punch strips 32.

The business form assembly 10 is also provided with a die cut window 36 for at least partially exposing the insert 18 therethrough. Although, in accordance with the presently preferred embodiment, the thermoplastic sheet of dormant adhesive is positioned between the insert 18 and the front or top sheet 12, it may also be positioned between the insert 18 and the bottom sheet 14. However, placement between the insert and the top sheet 12 provides the additional advantage that the sheet of thermoplastic material closes the window 36 to protect the insert 18 and allow easier feeding through postal sorting equipment. Towards this end, as will be more fully described hereafter, there is advantageously provided a window sealing line 38 which seals the sheet of thermoplastic material to the front or top sheet 12. This not only reinforces the window 36, but also reinforces the entire top or front sheet 12 of the outgoing mailer 10.

Figure 4A:
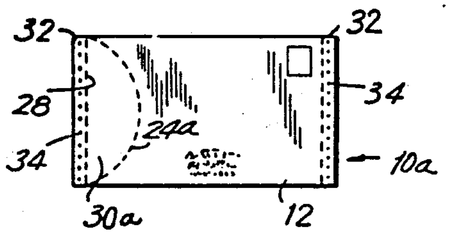
FIGS. 4*a*-8*b* are front elevational views of pre-inserted mailers of the type shown in FIG. 1, each showing different shaped tear strip perforations for releasing and removing the insert.
Figure 4B:
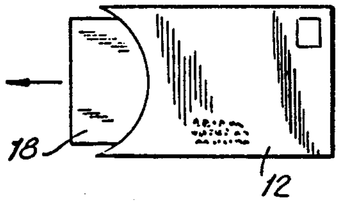
Figure 5A:
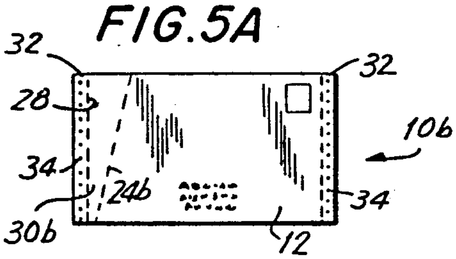
Figure 5B:
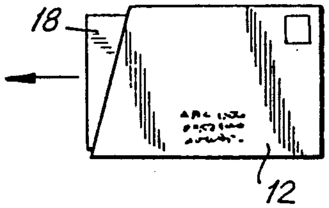
Figure 6A:
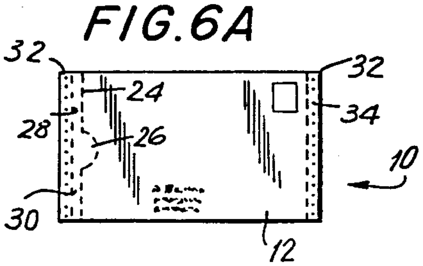
Figure 6B:
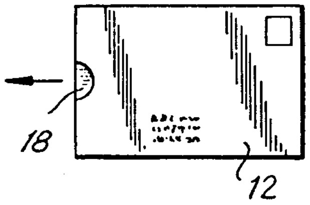
Figure 7A:
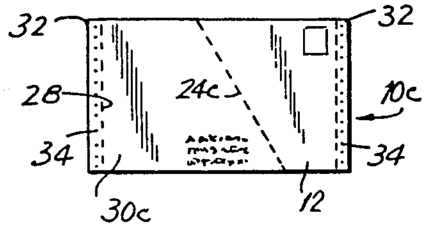
Figure 7B:
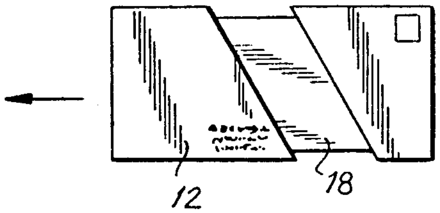
Figure 8A:
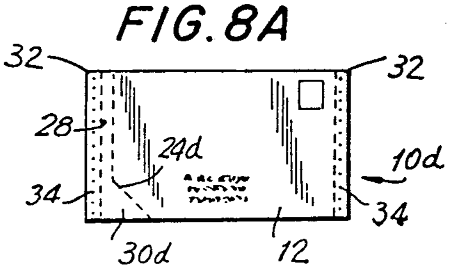
Figure 8B:
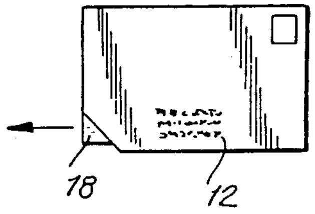

While the tear strip perforations 24 have been shown in FIG. 1 to be generally parallel with the lateral edges of the top and bottom sheets 12, 14, it is also possible to make the tear strip perforations in different shapes so as to variously expose the insert when the pre-inserted mailer is opened. For example, in FIGS. 4A, 4B, the tear strip portion 24*a* is shown to be sector-shaped to expose a like area of the insert when the tear strip portion 30*a* is removed. In FIGS. 5A, 5B, the tear strip perforation 24 is at an angle to the lateral edges of the mailer to define a generally triangle-shaped area which exposes a like area of the insert when the tear strip portion 30*b* is removed. FIGS. 6A and 6B illustrate a tear strip portion which is generally rectangle-shaped and corresponds to the arrangement shown in FIGS. 1–3. FIGS. 7A and 7B illustrates another possible arrangement wherein the tear strip perforation 24*c* is oriented at an angle relative to the marginal edges and disposed generally essentially within the mailer to form a trapezoid-shaped area whereby a like area of the insert is exposed when the tear strip portion 30*c* is removed or detached. The above mentioned tear strip shapes are only illustrative and can be combined with each other, as exemplified in FIGS. 8A and 8B wherein the tear strip portion 30*d* includes a generally rectangular portion and a triangular portion to expose a selected portion of an insert, such as a lower corner thereof.

Figure 9A:
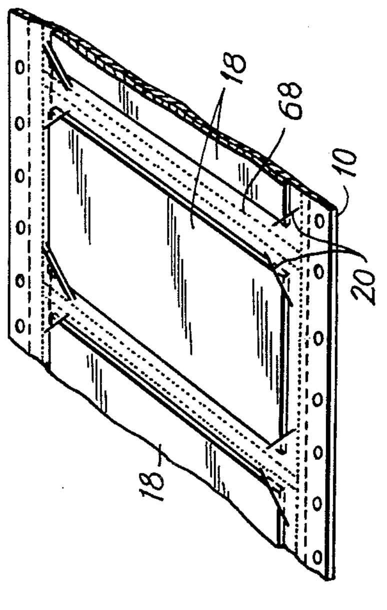
FIG. 9A is an enlarged top plan view of the web shown in FIG. 9 and illustrating the manner in which the activatable adhesive including the reactant may be applied in accordance with the present invention.
Figure 9:
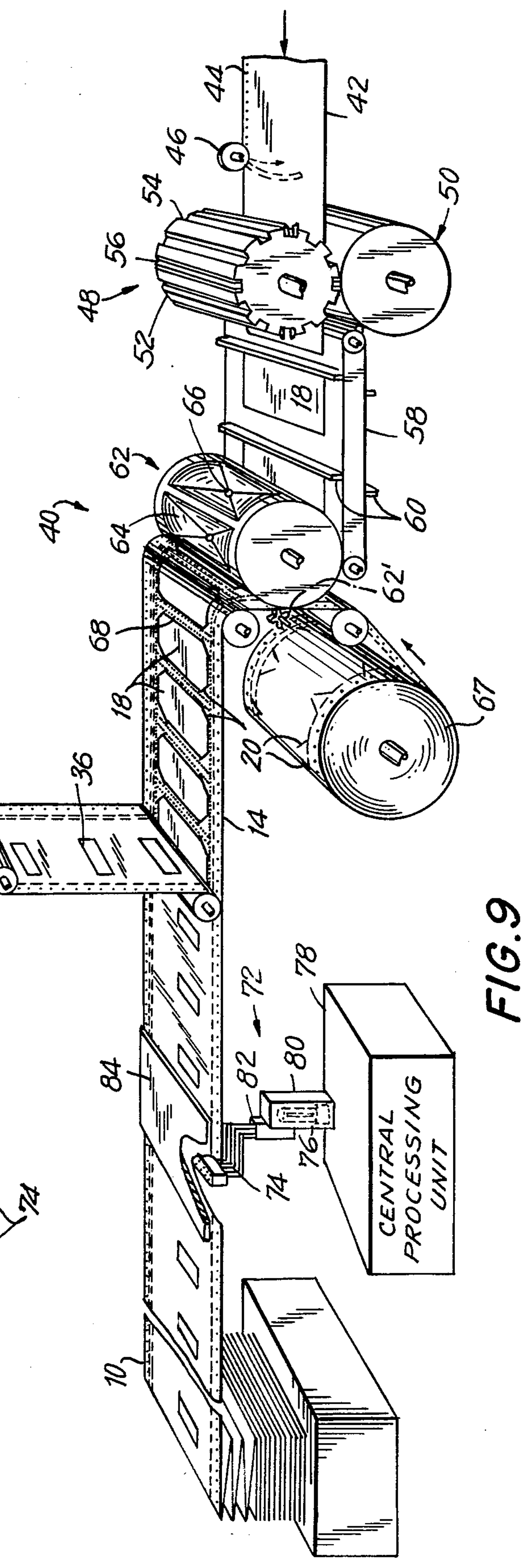
FIG. 9 is a schematic representation of a portion of a rotary business forms collator, showing the elements utilized in making the business form assemblies in accordance with the present invention.

Referring to FIG. 9, there is illustrated schematically a portion of a rotary collator 40 which is adapted to produce business form assemblies in accordance with the present invention. A web 42 is advanced from the collator roll stands. The web 42 includes one or more continuous sheets or plies of, for example, paper with or without carbon paper interleaved. The individual continuous sheets forming the insert web 42 may be selectively joined to each other by conventional methods.

In order to maintain all of the continuous sheets of the insert web 42 aligned or in registry with each other, marginal control punching 44 is provided along at least one edge of the insert web 42. The marginal control punching 44 is removed prior to notching by a side slitter 46, the removed margin with the control punching being fed into a trim disposal unit.

An interchangeable size notching or die cut unit 48 is provided for notching the insert web 42 once the marginal control punching 44 has been removed. The notching or die cut unit 48 includes a cylinder or anvil 50 below the insert web 42 and a notching cylinder 52 above the insert web 42. The notching cylinder 52 is provided with transverse grooves or slots 54 which are parallel to the axis of the cylinder and which are dimensioned and adapted to receive adjustable cutting bars 56. The grooves or slots 54 are spaced from each other about the circumference of the notching cylinder 52 to allow for notching the insert web 42 into standard uniform business form depths. Notching may be achieved by conventional means, including the use of cutting bars 56 each of which has two spaced knife edges for removing a predetermined section or strip of the insert web.

The notching cylinder 52 is advantageously interchangeable in size so as to match the circumference of standard press sizes.

Once the insert web 42 has been notched into appropriately sized insert packets 18, they are advanced by means of a conveyor belt or the like 58 towards a positioning and inserting unit 62. The convertor belt 58 may be provided with transverse ribs 60 to ensure that all of the components of the insert 18 advance as a unit and are synchronously fed into the positioning and inserting unit.

The positioning and inserting unit 62 may include an insertion drum 62 which positions or aligns the inserts 18 on one of the plies of the business form. In the embodiment of the collator 40 shown, the insertion drum 62 is provided with a plurality of circumferentially spaced insert flexing or distortion chambers 64 which exhibit or formed with compound concavity to assure proper deformation of the insert for insertion into the, for example, slits 20 shown in FIG. 1. Towards this end, each chamber 64 is provided with a vacuum port 66 for holding an insert, transporting the same and simultaneously deforming it so as to allow penetration of the corners of the inserts 18 into the slits 20 when the vacuum is removed and the insert 18 is restored to its normal planar configuration.

In the arrangement shown in FIG. 9, the inserts 18 are inserted into or positioned on the back ply 14 which is advanced from a roll 67 which is preprocessed and provided with the slits 20.

The front and back plies 12, 14 are brought together to form business form units 10′, and are advanced in registry with each other by means of pin feed chains (not shown).

As suggested above, the dormant adhesive used in accordance with the present invention is provided on a surface of the front or back ply which faces the other of the plies. In the arrangement shown in FIG. 9, therefore, the dormant adhesive is in the nature of a coating, preferably applied to the top or face ply 12. While the coating can be applied to the back ply 14, application of the coating to the face ply reinforces the die cut window 36. However, as will be more fully described in connection FIG. 12, the dormant adhesive may be in the nature of a thin sheet or membrane which is interposed between the front and back plies.

Additionally, a selective array of a lossy material or a Ferrite 68 in this preferred embodiment has been coated on at least one of the facing surfaces. The electro-magnetic reactant or Ferrite 68 may also be selectively coated on one of the facing surfaces with the thermoplastic material, usually in granular or powdered form in a vehicle such as clear printing ink.

The business form units are subsequently advanced to an activator or fusion station 72 wherein the dormant adhesive is selectively activated to provide the desired sealing lines in the business form assemblies to thereby define suitably dimensioned receiving compartments. Referring to FIG. 1, it will be noted that the sealing lines 22 include lines generally transverse to the web, as well as parallel to the direction of the web.

Making reference to FIGS. 9 and 9A, the sealing lines are formed by providing a plurality or bundle of coaxial conduits or radiators 74 which emit microwave radiation. The microwave radiation is produced by a suitable source such as a magnetron 76. Since the matrices or arrays formed by the radiators 72 must be capable of providing continously variable or changing imaging patterns, almost instantaneous changes in local heating are advantageously controlled by a micro or mini-computer 78 which allows the fast efficient change over from one job to another without tooling changes. Microwave energy emitted by the magnetron 76 probagates into the waveguides 80 and 82. PIN diodes can be used for the switching function therefore allowing microwave energy to pass to certain radiators 74 and block others thereby causing local heating over a predetermined pattern controlled by the microprocessor.

Electromagnetic radiation has the property that it is reflected unless it is absorbed in a suitable load. Since undesired reflections of the microwave energy emanating from the radiators 74 may produce spurious heating in the assembly 10, there is advantageously provided a radiation absorbent material 84 opposite the sealing unit 72 which absorbs the emitted radiation and assures that they are not reflected. This absorption minimizes the levels of microwave energy in the region of the collator, thereby minimizing hazards to personnel.

Figure 13:
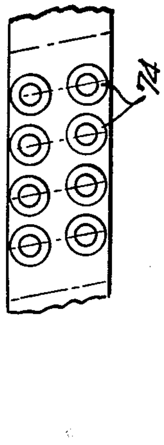
FIG. 13 is an enlarged bottom plan view of the sealing device shown in FIGS. 9 and 12.

The microwave radiators 74 shown in FIG. 9 are only intended to illustrate the general principle. The numer of radiators 74 and their specific arrangement is not critical for purposes of the present invention, and any number of radiators and their arrangement may be used to suite a particular purpose. Thus, the radiators shown in FIGS. 9 and 13 extend in two rows across the width of the collator, each row slightly inclined to decrease the space between the locally heated areas. Commercially available coaxial cables or conduits have a minimum diameter of approximately 0.030 but if smaller sizes are desired there is no theoretical minimum as long as the dimensional ratios of the inner and outer conductors are properly maintained.

The sealing unit 72 produces both the parallel and perpendicular sealing lines through programming of the microprocessor 78. Variations to fit various press sizes and particular widths and depths of forms are also accommodated through programming changes rather than tooling changes.

In directing energy at the portions to be joined, any one of a numer of sources may be used, such as optical or laser electron beams, X-rays or the like, but it has been found, through experimentation that microwave frequency exhibits the penetrating ability required for most presently desired applications.

In addition to achieving the aforementioned objects of the present invention, the use of microwave energy also reduces the engineering, development and tooling costs of the machine and increases its flexibility. As mentioned earlier, change over from one size to another simply requires the selection of a preprogrammed routine stored in memory.

Figure 12:
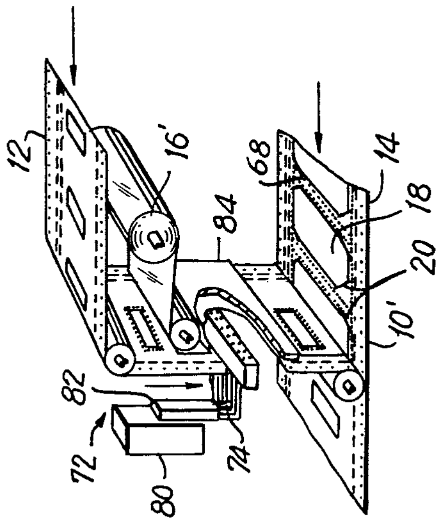
FIG. 12 is a fragmented portion of the apparatus shown in FIG. 9, illustrating a modified embodiment for providing dormant adhesive proximate to at least one ply of the business form assembly to which it is to be joined.

In FIG. 12, the collator 40 of FIG. 9 has been modified to allow the use of a separate sheet or membrane of thermoplastic material in place of the coating of dormant adhesive. In this arrangement, a sealing unit 72 is provided at a point just prior to the joining of the front and back plies 12, 14. The unit 72 includes a microwave generating source such as the magnetron 76 (not shown), waveguides 80 and 82, coaxial cables 74 to function as radiators and a cooled load 84 composed of ferrite to absorb spurious rays and eliminate reflections. This unit allows the selective sealing of a die-cut window 36 and therefore close said window with a membrane 16 to protect the contents and aid mail sorting. The selective sealing unit 72 is controlled by the same microprocessor and can also be programmed for producing local heating.

In FIG. 14, there is shown a business form assembly **10*e* in the nature of a two-way mailer, and includes a die cut window 36 in the front ply 12, the window being closed by a thermoplastic membrane or sheet 16 as described above. The top ply 12 is provided with a tear strip portion 30 which is removable along a tear strip perforation 24*a*. Shown in dashed outline at the lower end of the tear strip portion 30 is a perforated thumb notch formed in the rear or back ply 14 for allowing gripping of the tear strip portion 30 and removal thereof from the flap 94. Referring to FIG. 14*b*, the mailer is shown with the tear strip portion 30 removed to expose a flap 94 provided with a remoistenable glue 96 as shown. The thumb notch 98 is shown in FIG. 14*b*** at the lower end of the flap.

Figure 14A:
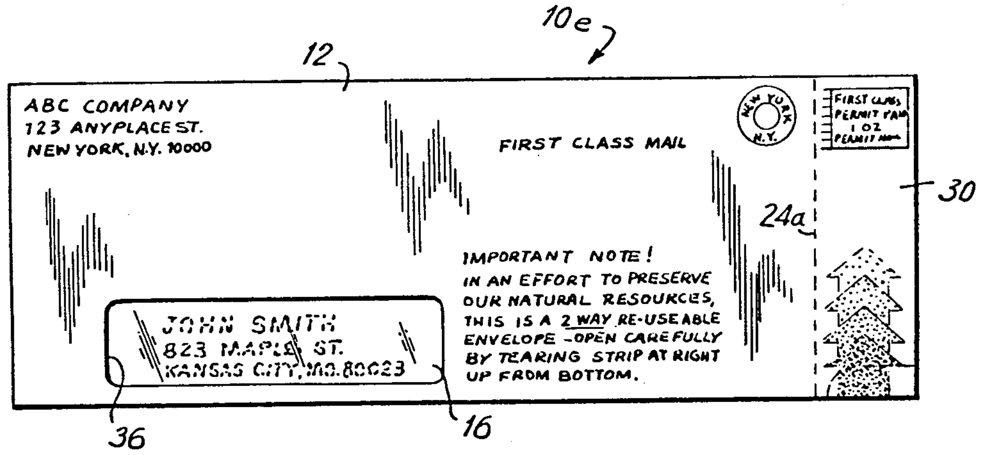
FIG. 14*a* is a front elevational view of another embodiment of the business form assembly of the present invention showing a two-way mailer wherein the outgoing envelope also serves a secondary function as a return envelope.
Figure 14D:
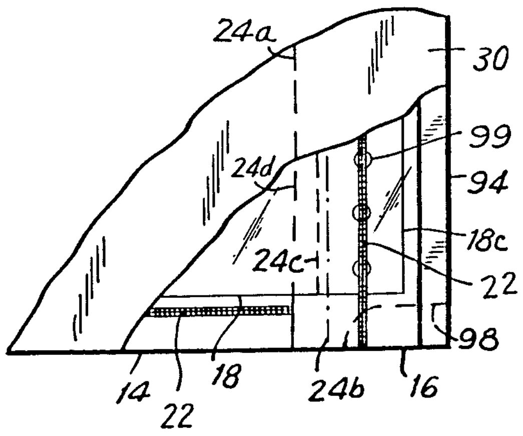
FIG. 14*d* is an enlarged section of the lower right-hand corner of the two-way mailer shown in FIG. 14*a*, broken away to show the details of the thumb notch for removing the tear strip and showing means for positioning the insert by applying the dormant adhesive through the punch holes of the insert thereby making it possible to release the insert when the tear strip is removed.
Figure 14B:
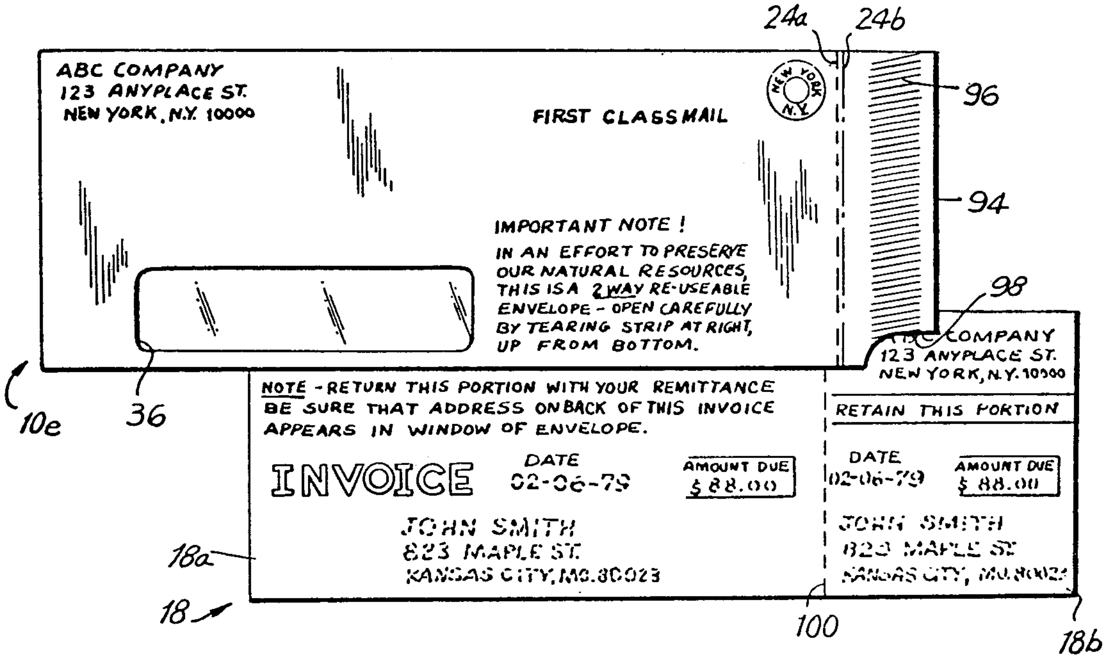
FIG. 14*b* is similar to FIG. 14*a*, illustrating removal of a tear strip and exposure of a flap with remoistenable glue and with the insert extracted.
Figure 14C:
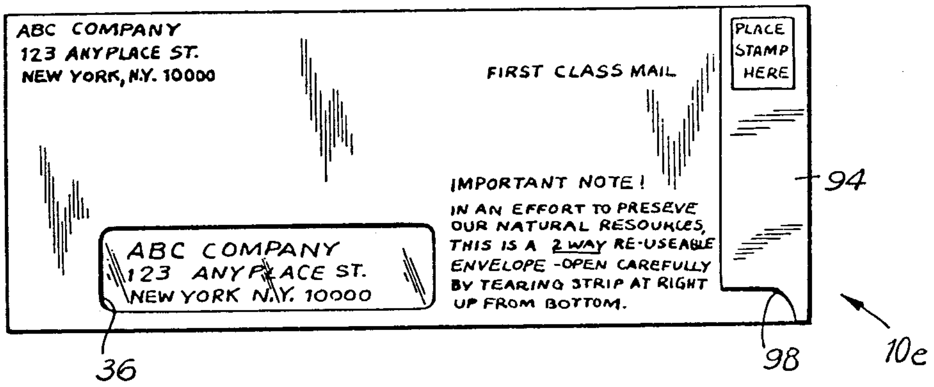
FIG. 14*c* is similar to FIGS. 14*a* and 14*b*, showing the envelope resealed with the insert now showing the return address.

In FIG. **14*b*, the insert 18 is shown removed from the mailer 10*e* and provided with an internal perforation 100 to form two insert portions 18*a* and 18*b*. Upon receipt, the recipient can remove the insert portion 18*b*, thereby shortening the insert and reinsert the insert portion 18*a* inside the mailer 10*e* with the back printed address facing up and appearing through the window. In FIG. 14*c*, the flap 94 is shown folded about the fold score line 24*b*** and resealed. This application permits the same envelope to be used both for mailing out the insert and returning the insert and remittance.

In FIG. **14*d*, a cut-away of the lower right-hand corner is shown, illustrating one means in which the insert can be positioned with respect to the mailer during assembly. With the mailer provided with selective punching 99 along the tear strip portion of the insert 18, with the thermoplastic sheet or membrane superimposed thereon, application of heat along a line bisecting the selective hole punching 99 seals the tear strip 30 to the tear strip portion 18*c* of the insert 18 and also detachably seals the tear strip portion 18*c* to the lower or back ply 14. The perforation 24*a* in the top ply 12 is preferably spaced a greater distance from the extreme right edge of the assembly, as viewed in FIG. 14*d*, than the perforation 24*c* of the insert. The perforation 24*d* of the thermoplastic sheet is advantageously aligned with the perforation 24*a* of the top ply so that when the tear strip 30** is removed, the corresponding width of the thermoplastic sheet is likewise removed to expose the insert and facilitate easy removal thereof.

While a separate sheet of thermoplastic material 16 must not be used in the embodiment shown in FIGS. **14*a*–14*c*, it is preferable that such a sheet be used since the business form requires manual reassertion of a portion of the insert 18*a* into the mailer 10*e*. The presence of the thermoplastic sheet, which covers the die cut window 36, facilitates reinsertion of the insert portion 18*a*** by providing a smooth interface at the die cut window. Additionally, the sheet of thermoplastic material, which has been adhered or joined to the top ply of the business form, reinforces the same. This allows the two-way mailer to be processed twice through the postal service.

An advantage of the two-way mailer shown in **14*a*–14*c* is that by being able to maintain a close tolerance of the width of the sealing lines 22** in accordance with the present invention, the envelope of the two-way mailer, when returned, can be opened on automatic opening/slitting equipment along the longer edge of the envelope. With the prior art return envelopes, because of the generally greater widths and bleeding of the cold water-soluble glue, automatic opening required the use of a more expensive top opening envelope.

The two-way mailer 10e, by using a die cut window, provides for a positive indication to the recipient as to whether he has re-inserted the insert portion 18a into the mailer prior to mailing the same. The insert portion 18a is normally necessary by the original sender or its agent for efficient application of remittances.

Mailers which use inserts made from self-contained or self-imaging paper, or use carbon for imaging purposes normally exhibit some bruising or marking as a result of being processed through mail-handling equipment. This problem, which has existed with prior art mailers, can be particularly acute with use of the two-way mailer of FIGS. 14a–14b because the same insert or a portion of the insert 18a is processed twice. In order to eliminate the problem of bruising or marking, the present invention also contemplates the selective application of clear chemical dye coatings for the purpose of imaging data on the insert 18. Towards that end, it is contemplated, for example, that the surface of the thermoplastic sheet 16 which faces the insert be coated with a chemical (CB) coating while the surface of the insert which faces the thermoplastic sheet is coated with a chemical (CF) coating. Both of these chemical coatings are clear and must interact before a visible image appears. The dye coatings which can be used for this purpose are of the type marketed by the 3M Company and NCR-Appleton Company. Although the CF chemical dyes are presently only factory coated, the same or similar dyes can be printed on the front of the insert by using a material such as "Action Print" marketed by the 3M Company. While the use of such chemical dye coatings would not eliminate all bruising or marking, this problem would be totally eliminated once the insert has been reversed in the compartment for remailing. It is only during the original mailing, when the CB and CF coatings are in abutment with each other that any bruising at all is possible. Once the insert is reversed, the coatings are rendered inactive. An additional advantage of using two separate chemical dye coatings as aforementioned is that at present, self-contained papers are only offered by manufacturers in a limited number of weights, grades and colors. Separate CB coatings, which can be applied to any paper stock, would result in an unlimited variety of weight, grades and colors of papers which can be used.

Figure 17:
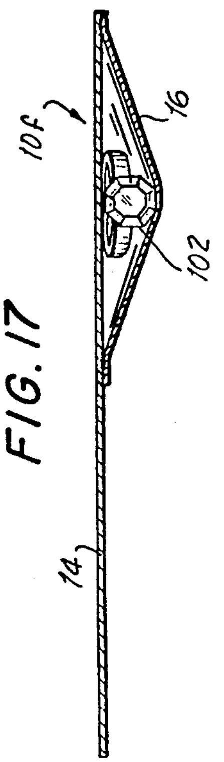
FIG. 17 is an enlarged cross-sectional view of the assembly shown in FIG. 15, taken along line 17—17.
Figure 16:
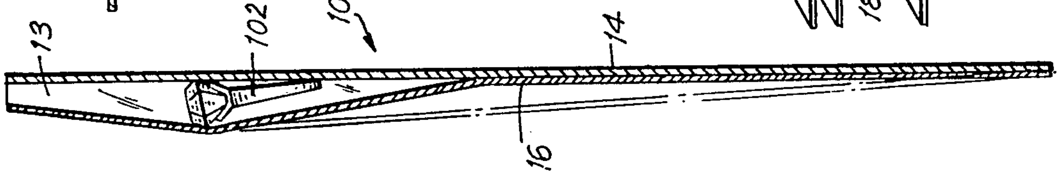
FIG. 16 is an enlarged cross-sectional view of the assembly shown in FIG. 15, taken along line 16—16 and further showing in phantom outline a larger compartment which may be formed for storing larger objects.
Figure 15:
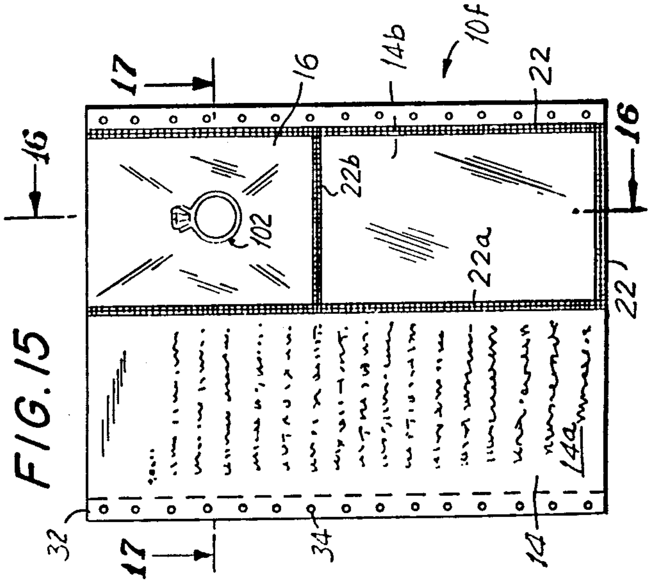
FIG. 15 is a top plan view of a further embodiment of the present invention, showing a business form assembly which includes a transparent compartment for storing and/or exhibiting an object.

In FIGS. 15–17, a still further embodiment of a business form assembly 10f is shown which is useful for the storage of objects which can also be viewed or displayed while in the assembly through a transparent or partially transparent thermoplastic sheet 16.

In the applications described thus far, the dormant adhesive has been either a coating or a separate sheet or membrane disposed between two separate plies which form the business form assembly. However, for purposes of the embodiment shown in FIG. 15, the layer of thermoplastic material itself is one of the plies which forms the resulting receiving compartment 13. The dimension of the receiving compartment is determined by the positions of the longitudinal sealing lines 22a, as well as the transverse sealing lines 22b. As suggested above, multiple receiving compartments can be formed by selecting a width of thermoplastic sheet material to allow the formation of two or more parallel sealing lines in any given direction. Where the width of the pockets is less than the width of the back ply 14, a portion 14a results which can be computer printed after the compartments are formed. Where, however, the pockets extend across the entire width of the back ply 14, the back ply can nevertheless be printed on through the thermoplastic sheet 16 by use of a self-imaging back ply 14.

In the arrangement of FIG. 9, wherein die cut windows 36 are used, printing of the inserts 18 can be effected without a separate cover sheet by the use of self-contained carbonless paper such as, for example, manufactured by the Appleton Paper Company of Appleton, Wis. The 3M Company of St. Paul, Minn., also manufactures a paper known as "Type 100", which can be used for this purpose. With this arrangement, the insert can be printed without a ribbon or through an uncoated mylar ribbon on an impact printer.

Figure 18:
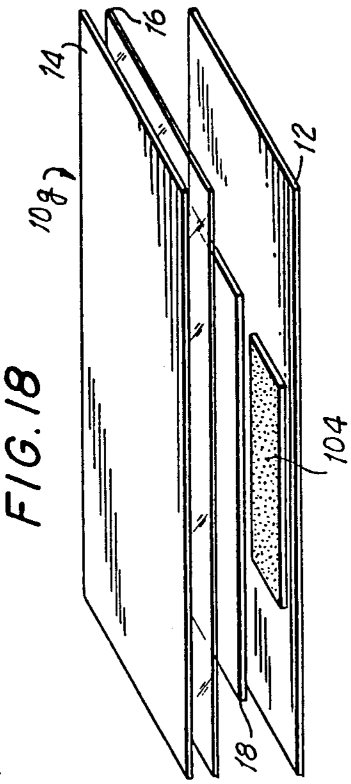
FIG. 18 shows an arrangement of the front and back plies of a pre-inserted mailer in the instance where a separate sheet of dormant adhesive is used, showing hot wax carbon spot means for transferring data to the insert.

When a cover sheet is required, or when the front ply 12 is not provided with die cut windows, another means for image transfer is used in FIG. 18 wherein the front and rear plies 12, 14 are reversed from the positions shown in FIGS. 9 and 12. The insert 18 is positioned between the thermoplastic sheet of material and the front ply 12. By positioning the bottom ply 12 below the insert 18, and the top ply 14 and thermoplastic sheet 16 above the insert 18, the same collator 40 can be used without material modification. Image transfer can, in the arrangement of FIG. 18, be achieved in a number of ways. Firstly, hot wax spot carbon 104 may be selectively provided on the inside surface of the face ply 12 facing the insert 18, and also provided on individual insert plies as required. Alternately, selective chemical carbonless mated coatings, such as "action print" manufactured by the 3M Company can be used. Spot coated carbon tissue can be interleaved between the face ply 12 and the individual insert plies as required.

Figure 19:
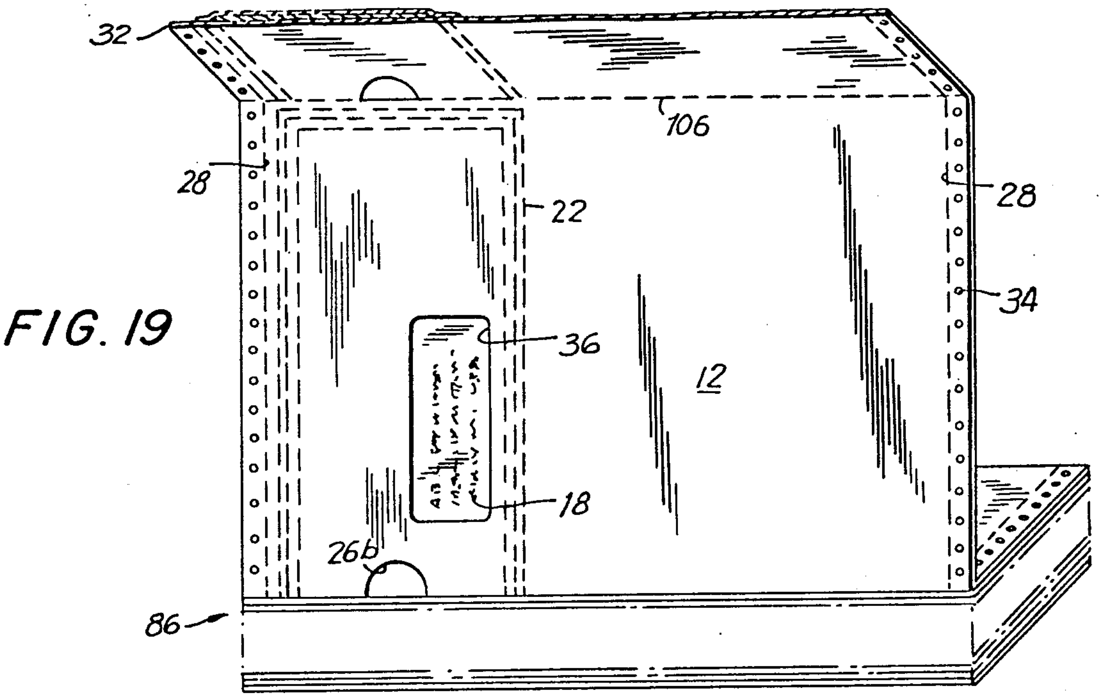

Referring to FIG. 19, there is shown a flat pack 86 of a still further embodiment of the invention, wherein a series of letters each include a receiving compartment closed on only three sides and containing a reply envelope or reply card or a combination of the two whose edge at the exit opening of the compartment is flush therewith. This product can be printed on a matrix printer or the like which can print vertically so that the address can be properly read when the insert is turned 90°. Additionally, the embodiment shown in FIG. 19 may also be adapted for printed on word processing equipment.

Figure 20:
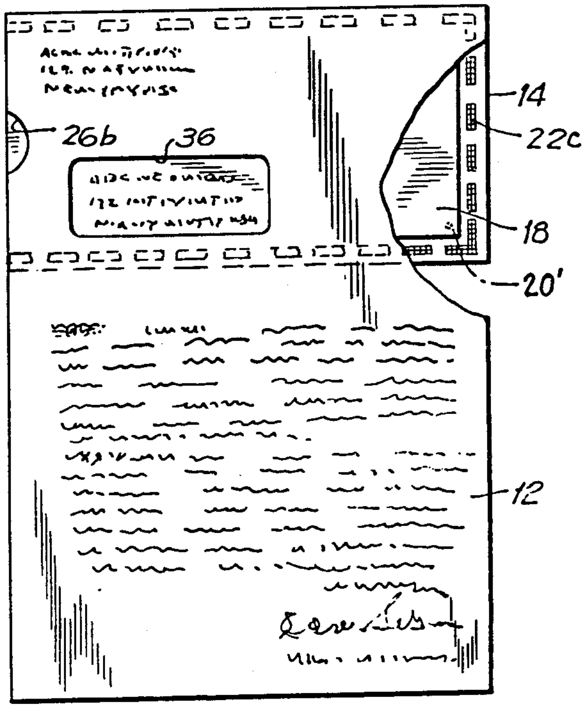
FIG. 20 is a front elevational view of still another embodiment of a business form assembly in accordance with the present invention, showing a separate or cut assembly with a pre-inserted return card or envelope which can be addressed on an addressing machine or automatically labelled.

The letters and reply cards or envelopes shown in FIG. 20 are generally similar to those shown in FIG. 19 except that they are individually cut into single units. In this instance, addressing of the insert may be accomplished in an addressing machine or by automatic labelling machines.

An alternative approach to the positioning means described above, namely the slits 20, the inserts 18 can be detachably joined to one of the top or bottom plies 12, 14 for preventing excessive movement of the insert relative to such plies during assembly of the business form. In FIG. 9, there is shown in phantom outline a segmented or interrupted heating wheel or disc which is arranged to activate dormant adhesive between the insert and the ply to which it is to be joined. When the insert 18 is to be moved from such a business form assembly, the land or the adjoining paper surfaces to which the land is attached share and allow ready removal of the insert with minimal damage thereto. The segmented wheel or disc 62' can be selected to provide small or large uniform land areas, and the areas of the lands can be readily changed by changing the disc 62'. As with the other activating elements described above, suitable temperature sensing means is advantageously used with the disc 62', and suitable means are provided for moving the disc 62' away from the web when the web stops to advance. In FIG. 20, a land 20' of the type that may be formed by the disc 62' is shown. The land 20' is formed between the insert 18 and the back ply 14, the land 20' securing the insert 18 thus preventing interference by the insert during joining of the front and back plies 12, 14 along the peripheral portions by means of the interrupted sealing lines 22c. While only land 20' is shown for securing the insert 18 to the back ply 14, any number of such lands may be used as necessary. Preferably, at least two lands 20' are used to positively position the insert on the ply to which it is to be attached.

It is to be understood that the foregoing description of the various embodiments illustrated herein is exemplary and various modifications to the emnbodiments shown herein may be made without departing from the spirit and scope of the invention.

What is claimed is:

1. A method of producing a multi-ply business form assembly comprising the steps of superimposing at least front and back sheets, with at least one of said sheets being provided on the surface thereof facing the other of said sheets with a dormant adhesive in heat transfer relationship with an electromagnetic reactant which generates heat when exposed to electromagnetic radiation; transfer medium between at least some of said sheets for selected printing thereon; and selectively activating the formant adhesive by selectively directing electromagnetic radiation at said dormant adhesive and said electromagnetic reactant to form sealing lines having generally negligible thicknesses and uniform widths along their lengths between said sheets, said sealing lines together defining a receiving compartment.

2. A method as defined in claim 1, wherein said dormant adhesive is electromagnetic activatable and said step of activating said adhesive comprises the step of selectively directing electromagnetic radiation at said surface portions and through said front and back sheets.

3. A method as defined in claim 2, wherein said step of activating said adhesive comprises the step of selectively directing microwaves through said front and back sheets when the same are in abutment against each other.

4. A method as defined in claim 2, further comprising the steps of controlling the temperature of the heating within a predetermined range by selecting a ferrite having a desired curie point for the electromagnetic reactant, said curie point being selected to be below the kindling and char points of said sheets.

5. A method as defined in claim 1, further comprising the step of placing an insert between said front and back sheets, said insert having dimensions generally smaller than those of said sheets to provide said surface portion on said sheets which face each other when said sheets are superimposed.

6. A method as defined in claim 5, wherein said front sheet is provided with a die cut window for exposing a portion of said insert therethrough, said portion of said insert being provided with self imaging means for displaying information through said window when processed through an impact printer with ribbon removed, said dormant adhesive being in the nature of a separate sheet of thermoplastic material, and further comprising the step of interposing said sheet of thermoplastic material between said one sheet and said insert to thereby cover said die cut window.

7. A method as defined in claim 5, wherein said dormant adhesive is the nature of a separate sheet of thermoplastic material, and further comprising the steps of interposing said sheet of thermoplastic material between said one sheet and said insert, and providing selective image transfer means between the other of said sheets and said insert to permit selective transfer of information to said insert through the other of said sheets without interference from said sheet of thermoplastic material.

8. A method as defined in claim 5, further comprising the step of positioning said insert on one of said sheets prior to said step of activating said adhesive to assure that said surface portions can be joined during said activating step.

9. A method as defined in claim 8, wherein said positioning step comprises the step of loosely securing said insert to said one of said sheets.

10. A method as defined in claim 9, wherein said one of said sheets is provided with slits which are spaced from each other along a path generally corresponding to the peripheral outline of said insert, said securing step comprising the step of inserting portions of the periphery of said insert through said slits.

11. A method as defined in claim 1, further comprising the step of selecting said dormant adhesive to be made of a thermoplastic material.

12. A method as defined in claim 11, wherein said thermoplastic material is in the nature of a separate sheet, and further comprising the step of interposing said sheet of thermoplastic material between said front and back sheets.

13. A method as defined in claim 12, further comprising the step of selectively directing electromagnetic radiation at said electromagnetic reactant and joining said sheet of thermoplastic material to at least one of said sheets in at least one area spaced from said sealing lines thereby joining said front and back sheets whereby said sheet of thermoplastic material reinforces said at least one of said sheets.

14. A method as defined in claim 1, further comprising the step of providing a dormant adhesive in the nature of a thermoplastic material on each of said front and back sheets on the surface thereof facing each other, whereby activation of said dormant adhesive forms a receiving compartment which is reinforced and waterproof.

15. A method as defined in claim 1, wherein said dormant adhesive is in the nature of a separate sheet of thermoplastic mateial interposed between said front and back sheets, and further comprising the step of providing removable means on at least one of said front and back sheets for providing an access opening to said receiving compartment along a portion of the periphery thereof and for producing a flap adapted for closing said access opening to thereby close said receiving compartment and adapted to form a secondary business form assembly in the nature of a return envelope.

16. A method of producing a series of multi-ply business form assemblies comprising the steps of advancing continuous at least upper and lower webs, and a transfer medium between at least some of said webs for selectively printing thereon, each of said upper and lower webs being provided with a series of longitudinally spaced generally transverse perforated lines of weakening to define a plurality of successive sets of front and back sheets, at least one of said sheets of each set being selectively provided on the surface portions facing the other of said sheets with a dormant adhesive in heat transfer relationship with an electromagnetic reactant which generates heat when exposed to electromagnetic radiation; and selectively activating said adhesive by selectively directing electromagnetic radiation at said dormant adhesive and said electromagnetic reactant on at least some of said surface portions on successive sets of front and back sheets to form sealing lines having generally negligible thicknesses and uniform widths along their lengths thereby forming a series of business form assemblies each having a receiving compartment and being detachable from each other at said transverse perforated lines of weakening.

17. A method of producing a series of business form assemblies as defined in claim 16, further comprising the step of arranging an insert between each set of front and back sheets, said insert having dimensions generally smaller than those of said sheets to provide surface portions on said sheets which face each other when said sheets are superimposed, whereby each receiving compartment at least partially captivates an associated insert to form a series of business form assemblies.

* * * * *